United States Patent
Chinthu et al.

(10) Patent No.: US 12,506,405 B2
(45) Date of Patent: Dec. 23, 2025

(54) CHARGE PUMP WITH PASS TRANSISTOR CONTROLLED BY A SUPPLEMENTARY CHARGE PUMP STAGE

(71) Applicant: GlobalFoundries U.S. Inc., Malta, NY (US)

(72) Inventors: Siva Kumar Chinthu, Bangalore (IN); Palle Sundar Veerendranath, Bangalore (IN); Sunil Kumar, Bangalore (IN); Lalit Mohan Dani, Bangalore (IN)

(73) Assignee: GlobalFoundries U.S. Inc., Malta, NY (US)

( * ) Notice: Subject to any disclaimer, the term of this patent is extended or adjusted under 35 U.S.C. 154(b) by 148 days.

(21) Appl. No.: 18/592,604

(22) Filed: Mar. 1, 2024

(65) Prior Publication Data

US 2025/0279720 A1    Sep. 4, 2025

(51) Int. Cl.
*H02M 3/07*   (2006.01)
*H02M 1/15*   (2006.01)

(52) U.S. Cl.
CPC .............. *H02M 3/07* (2013.01); *H02M 1/15* (2013.01)

(58) Field of Classification Search
CPC .................................. H02M 3/07; H02M 1/15
See application file for complete search history.

(56) References Cited

U.S. PATENT DOCUMENTS

| | | | |
|---|---|---|---|
| 5,493,249 A | 2/1996 | Manning | |
| 6,980,045 B1 * | 12/2005 | Liu | H02M 3/073 363/59 |
| 10,249,346 B2 * | 4/2019 | Michael | G11C 16/12 |
| 11,569,738 B1 | 1/2023 | Chinthu | |
| 2006/0140003 A1 * | 6/2006 | Yamazoe | G11C 16/14 365/185.18 |
| 2010/0327959 A1 | 12/2010 | Lee | |
| 2013/0063118 A1 * | 3/2013 | Nguyen | G11C 5/145 323/304 |
| 2022/0165339 A1 * | 5/2022 | Rana | G11C 29/12005 |

OTHER PUBLICATIONS

Pelliconi et al., "Power Efficient Charge Pump in Deep Submicron Standard CMOS Technology," IEEE Journal of Solid-State Circuits, vol. 38, No. 6, Jun. 2003, pp. 1068-1071.
Navidi et al., "A Regulated Charge Pump with Extremely Low Output Ripple," Electronics 2019, vol. 8, Issue 11, Published Nov. 6, 2019, 16 pages.

* cited by examiner

*Primary Examiner* — Sibin Chen
(74) *Attorney, Agent, or Firm* — David Cain; Hoffman Warnick LLC (57) ABSTRACT

Disclosed is a charge pump circuit including: a single primary charge pump stage or multiple primary charge pump stages connected in series; a pass transistor connected between an output node of the primary charge pump stage (or of the last of the multiple primary charge pump stages, if applicable) and an output terminal; and a supplementary charge pump stage. The supplementary charge pump stage receives the same input voltage as the primary charge pump stage (or the same input voltage as the last of the multiple primary charge pump stages, if applicable) and controls the gate of the pass transistor to reduce ripple at the output terminal. A capacitive load can also be connected to the output terminal to reduce ripple and the size of the capacitive load can be selected to achieve a desired balance between the amount of ripple and circuit size.

20 Claims, 5 Drawing Sheets

Example 1:
Incorporate SPC stage, maintain RL (e.g., 1.6kiloohms(kΩ), maintain CL (e.g., 160picoFarads(pF)), and reduce aVout ripple (e.g., 147mV to 27mV)

FIG. 2D

Example 2:
Incorporate SPC stage, maintain RL (e.g., 1.6 kΩ), maintain aVoutr (e.g., at 147mV), and reduced CL (e.g., from 160pF to 16pF)

FIG. 3

CHARGE PUMP WITH PASS TRANSISTOR CONTROLLED BY A SUPPLEMENTARY CHARGE PUMP STAGE

BACKGROUND

The present disclosure relates to charge pumps and, more particularly, to embodiments of a charge pump configured for reduced output voltage ripple and/or area.

A charge pump circuit is a circuit configured to convert a direct current (DC) power source (i.e., an input voltage (Vin)) to a larger DC power source (e.g., to an output voltage (Vout) that is greater than Vin). The circuit can be a single-stage charge pump circuit or a multi-stage charge pump circuit. A single-stage charge pump circuit can, for example, convert a Vin that is equal to a positive supply voltage (VDD) to a Vout that is approximately 2*VDD or somewhat less when an electrical load is connected to the output to drive current. For example, if Vin is 1.8V, then Vout could be approximately 3.6V or reduced to, for example, 3.0V due to a resistive load connected to the output. A multi-stage charge pump can include n-stages and can, for example, convert a Vin that is equal to VDD to a Vout that is approximately (n+1)*VDD or somewhat less when an electrical load is connected to the output to driver current. Regardless of whether the charge pump is a single-stage or a multi-stage charge pump circuit, Vout may exhibit significant ripple. Ripple refers to periodic variation exhibited by a DC voltage and this variation can negatively impact performance of devices connected to receive Vout. Typically, Vout ripple is reduced by increasing the capacitance load (CL) at the output of the charge pump. However, adding capacitance can significantly increase circuit area.

SUMMARY

Disclosed herein are embodiments of a structure and, particularly, of a charge pump circuit.

In some embodiments, the structure can include a primary charge pump stage with an input node and an output node. The structure can further include a supplementary charge pump stage with an additional input node and an additional output node. The input node of the primary charge pump stage and the additional input node of the supplementary charge pump stage can be connected to receive an input voltage. The structure can further include an output terminal and a pass transistor, which is connected between the output terminal and the output node of the primary charge pump and which has a gate connected to the additional output node of the supplementary charge pump stage.

In other embodiments, the structure can include a primary charge pump stage with an input node and an output node. The structure can further include a supplementary charge pump stage with an additional input node and an additional output node. The input node of the primary charge pump and the additional input node of the supplementary charge pump can be connected to receive an input voltage. The structure can further include an output terminal, which is connected to a capacitive load. The structure can further include a pass transistor, which is connected between the output terminal and the output node of the primary charge pump stage and which has a gate connected to the additional output node of the supplementary charge pump stage.

In still other embodiments, the structure can include multiple primary charge pump stages connected in series. The primary charge pump stages can include at least a first primary charge pump stage and a last primary charge pump stage. Furthermore, the last primary charge pump stage can include a last input node and a last output node. The structure can further include a supplementary charge pump stage with an additional input node and an additional output node. The last input node of the last charge pump stage and the additional input node of the supplementary charge pump stage can be connected to receive a last input voltage from a preceding primary charge pump stage. The structure can further include an output terminal and a pass transistor, which is connected between the output terminal and the last output node of the last primary charge pump stage and which has a gate connected to the additional output node of the supplementary charge pump stage.

BRIEF DESCRIPTION OF THE DRAWINGS

The present disclosure will be better understood from the following detailed description with reference to the drawings, which are not necessarily drawn to scale and in which.

DETAILED DESCRIPTION

As mentioned above, a charge pump circuit is a circuit configured to convert a direct current (DC) power source (i.e., an input voltage (Vin)) to a larger DC power source (e.g., to an output voltage (Vout) that is greater than Vin). The circuit can be a single-stage charge pump circuit or a multi-stage charge pump circuit. A single-stage charge pump circuit can, for example, convert a Vin that is equal to a positive supply voltage (VDD) to a Vout that is approximately 2*VDD or somewhat less when an electrical load is connected to the output to drive current. For example, if Vin is 1.8V, then Vout could be approximately 3.6V or reduced to, for example, 3.0V due to a resistive load connected to the output. A multi-stage charge pump can include n-stages and can, for example, convert a Vin that is equal to VDD to a Vout that is approximately (n+1)*VDD or somewhat less when an electrical load is connected to the output to driver current. Regardless of whether the charge pump is a single-stage or a multi-stage charge pump circuit, Vout may exhibit significant ripple. Ripple refers to periodic variation exhibited by a DC voltage and this variation can impair performance of devices connected to receive Vout. Typically, Vout ripple is reduced by increasing the capacitance load (CL) at the output of the charge pump. However, adding capacitance can significantly increase circuit area.

In view of the foregoing, disclosed herein are embodiments of a structure and, particularly, a charge pump circuit configured for reduced output voltage ripple at the output terminal of the circuit and/or for reduced circuit area. In each of the embodiments, the circuit can include a single primary charge pump stage or multiple primary charge pump stages connected in series. A pass transistor can be connected between an output node of the primary charge pump stage (or an output node of the last of the multiple primary charge pump stages, if applicable) and the output terminal of the circuit. A supplementary charge pump stage can be connected to receive the same input voltage as the primary charge pump stage (or the same input voltage as the last of the multiple primary charge pump stages, if applicable) and can further control the gate of the pass transistor in order to reduce the output voltage ripple at the output terminal. The circuit can further include a capacitive load connected to the output terminal, also to reduce output voltage ripple. Thus, during design, the size of the capacitive load can be selected to achieve a desired balance between the amount of output voltage ripple and the overall size of the circuit (which increases or decreases as a function of the load capacitance).

More particularly, referring to FIG. 1A, disclosed herein are embodiments of a structure and, particularly, of a charge pump circuit 100 (hereinafter referred to as circuit 100) including a single primary charge pump (PCP) stage 110.

PCP stage 110 can include an input node 115, an output node 116, and a pair of cross-coupled inverters 111 and 112 connected between input node 115 and output node 116. One inverter 111 can include an N-channel field effect transistor (NFET) 111a and a P-channel field effect transistor (PFET) 111b connected in series between input node 115 and output node 116. Another inverter 112 can similarly include an NFET 112a and a PFET 112b connected in series between input node 115 and output node 116. An intermediate node 117 at the junction between NFET 111a and PFET 111b (e.g., on an interconnect electrically connecting NFET 111a to PFET 111b) can be electrically connected to the gates of NFET 112a and PFET 112b. Similarly, an intermediate node 118 at the junction between NFET 112a and PFET 112b (e.g., on an interconnect electrically connecting NFET 112a and PFET 112b) can be electrically connected to the gates of NFET 111a and PFET 111b.

PCP stage 110 can further include a pair of clock signal nodes 121 and 122. Clock signal nodes 121 and 122 can be electrically connected to receive a clock signal (CLK1) and an inverted clock signal (CLK1B), respectively, from a clock driver 105, as discussed in greater detail below.

PCP stage 110 can further include a pair of capacitors 113 and 114 connected between the clock signal nodes 121 and 122 and the intermediate nodes 117 and 118, respectively. That is, capacitor 113 can include conductive plates, which are connected to clock signal node 121 and intermediate node 117, respectively, and which are separated from each other by a capacitor dielectric. Capacitor 114 can similarly include conductive plates, which are connected to clock signal node 122 and intermediate node 118, respectively, and which are also separated from each other by a capacitor dielectric.

In this PCP stage 110, input node 115 can be connected to receive a direct current (DC) power source (i.e., an input voltage (Vin)). Vin can, for example, be at the level of a relatively low positive supply voltage (VDDA). This relatively low VDDA can, for example, correspond to the maximum voltage ratings of the devices used (e.g., of NFET 111a, PFET 111b, NFET 112a, and PFET 112b). For example, if NFET 111a, PFET 112b, NFET 112a, and PFET 112b are all rated as 1.8 volt (V)-FETs (e.g., with a maximum gate-source voltage (VGS) rating of 1.8V, a maximum gate-drain voltage (VDS) of 1.8V, and a maximum source-drain voltage (VSD) rating of 1.8V), then VDDA could be 1.8 volts (V). If NFET 111a, PFET 111b, NFET 112a, and PFET 112b are all 1.5V-FETs, then VDDA could be 1.5V, and so on.

Additionally, in this PCP stage 110, CLK1 can swing periodically between 0.0V and VDDA and CLK1B can swing periodically between VDDA and 0.0V. That is, as CLK1 changes from VDDA to 0.0V, CLK1B switches from 0.0V to VDDA and vice versa. As mentioned above, CLK1 and CLK1B can be received by PCP stage 110 from a clock driver 105.

Figure 1A:
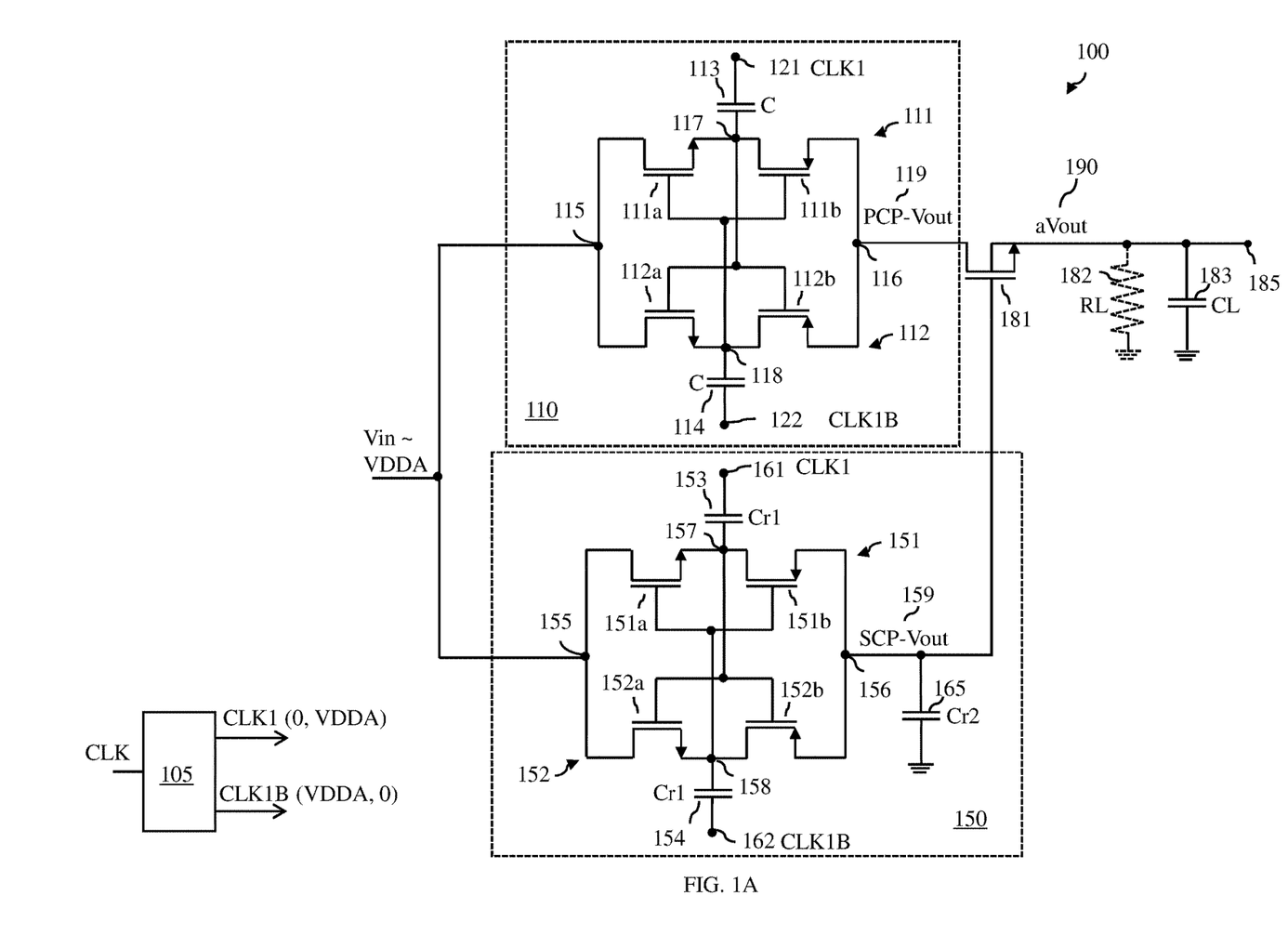
FIG. 1A is a schematic diagram illustrating disclosed embodiments of a charge pump circuit.
Figure 1B:
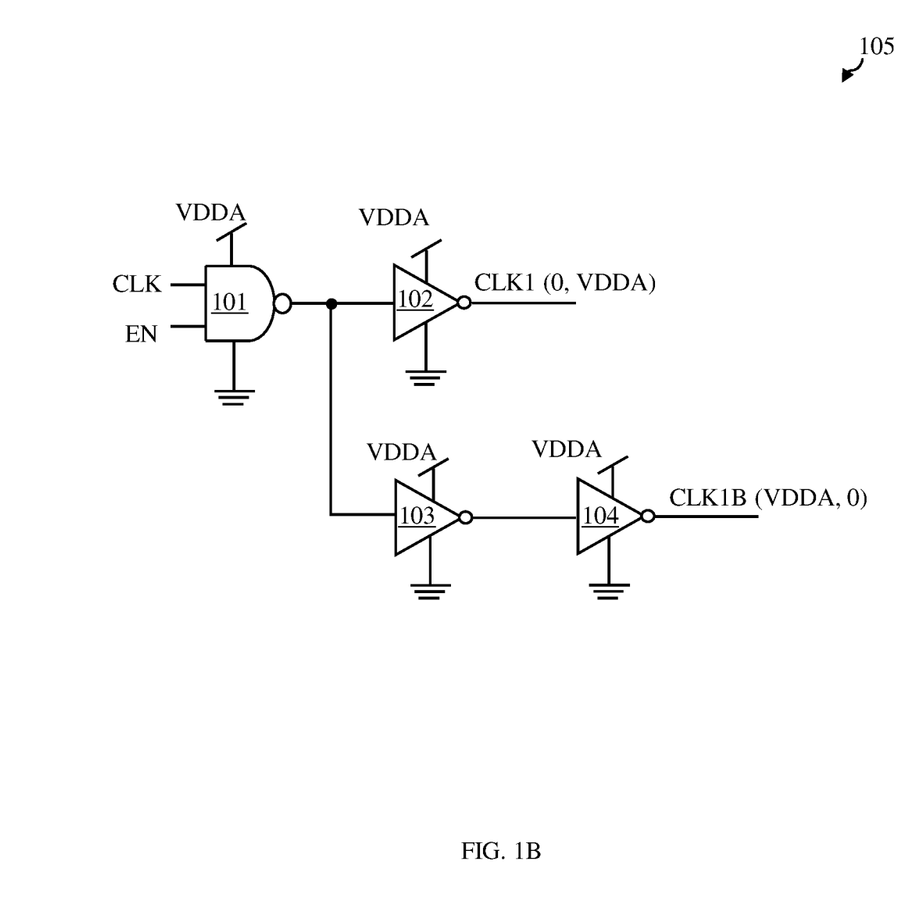
FIG. 1B is a schematic diagram illustrating an example of a clock driver that can be incorporated into the charge pump circuit of FIG. 1A.

FIG. 1B is a schematic diagram illustrating one example of a clock driver 105 that can be employed to output CLK1 and CLK1B. As illustrated, clock driver 105 can include, for example, a NAND gate 101, which is electrically connected to a positive power supply at VDDA and further electrically connected to GND (e.g., at 0.0V). NAND gate 101 can receive, as inputs, an initial clock signal (CLK), which swings between 0.0V and VDDA, and an enable signal (EN). NAND gate 101 can output a given logic value according to a conventional NAND gate truth table. That is, the logic value output by NAND gate 101 will be high (at VDDA) when the following conditions are met: CLK and EN are both low, CLK is low and EN is high, and CLK is high and EN is low. The logic value output by NAND gate 101 will be low (at 0.0V) when CLK and EN are both high. In operation, the logic value output by NAND gate 101 can oscillate between GND and VDDA (as a function of CLK and EN) effectively creating a voltage pulse. For purposes of this disclosure, a "voltage pulse" refers to an essentially rectangular direct current voltage signal that transitions between a low voltage level and a high voltage level at regular and repeated intervals such that the pulse is at the low voltage level for a first time period (t1), switches to the high voltage level and remains at the high voltage level for a second time period (t2) (which is the same as or different from t1), switches back to the low voltage level and again remains at the low voltage level for t1, and so on.

Clock driver 105 can further include a single inverter 102 (also referred to herein as an inverting buffer) electrically connected to receive the voltage pulse from NAND gate 101. Clock driver 105 can further include a pair of series-connected inverters 103-104 (also referred to herein as series-connected inverting buffers) also electrically connected to receive the voltage pulse from NAND gate 101. These inverters 102-104 can each be connected to the positive power supply at VDDA and to GND. In response to the voltage pulse from the NAND gate 101, inverter 102 can output CLK1 (which transitions between GND and VDDA) and the series-connected inverters 103-104 can output CLK1B (which is inverted with respect to CLK1 so that when CLK1 transitions from GND to VDDA, CLK1B transitions from VDDA to GND and vice versa). It should be noted that the example of the clock driver 105 described above is provided for illustration purposes and not intended to be limiting. Alternatively, any other suitable clock driver configured to generate and output CLK1 and CLK1B, as described could be employed.

Referring again to FIG. 1A, in operation, input node 115 of circuit 100 receives Vin, which is steady at VDDA. Clock signal node 121 and thereby capacitor 113 receives CLK1. Clock signal node 122 (and thereby capacitor 114) receives CLK1B. As a result, the voltage signal at intermediate node 117 between NFET 111a and PFET 111b of inverter 111 transitions between VDDA and a higher voltage that is approximately double the magnitude of VDDA (e.g., +/−10%). Furthermore, the voltage signal at intermediate node 118 between NFET 112a and PFET 112b of inverter 112 will be inverted with respect to the voltage signal at intermediate node 117. Thus, when CLK1 switches to GND and CLK1B switches to VDDA, the voltage signal at intermediate node 117 drops to VDDA turning off NFET 112a and turning on PFET 112b and the voltage signal at intermediate node 118 is raised to 2*VDDA, turning on NFET 111a and turning off PFET 111b. Contrarily, when CLK1 switches to VDDA and CLK1B switches to GND, the voltage signal at intermediate node 117 rises to 2*VDDA, turning on NFET 112a and turning off PFET 112b and the voltage signal at intermediate node 118 drops to VDDA turning off NFET 111a and turning on PFET 111b. As a result, the output voltage of PCP (PCP-Vout 119) at output node 116 is continuously pulled toward 2*VDDA, regardless of the states of CLK1 and CLK1B. Thus, for example, if VDDA is 1.8V, then PCP-Vout 119 would be continuously pulled toward 3.6V. Output node 116 of PCP stage 110 is further electrically connectable to an output terminal 185 of circuit 100.

Optionally, circuit 100 can also include a resistive load 182, which is electrically connected to output terminal 185 for driving current. This resistive load 182 may reduce the voltage level at output terminal 185 somewhat. For example, given a resistive load 182, an adjusted output voltage (aVout) 190 at output terminal 185 may be pulled down somewhat. For example, if PCP-Vout 119 on output node 116 is on average at a voltage level of 2*VDDA (e.g., at 3.6V), then a Vout 190 at output terminal 185 may be average 600 mV less (e.g., 3.0V).

Furthermore, ripple of PCP-Vout 119 may be significant. As mentioned above, ripple refers to periodic variation exhibited by a DC voltage. Therefore, circuit 100 can include a combination of components designed to reduce ripple of a Vout 190 at output terminal 185 and, particularly, to ensure that a Vout ripple is less than PCP-Vout ripple. PCP-Vout ripple refers to the difference between the maximum voltage level exhibited by PCP-Vout 119 (i.e., PCP-Vouth) and the minimum voltage level exhibited by PCP-Vout 119 (i.e., PCP-Voutl). aVout ripple refers to the difference between the maximum voltage level exhibited by a Vout 190 (i.e., a Vouth) at output terminal 185 and the minimum voltage level exhibited by aVout 190 (i.e., aVoutl). The ripple reducing components can include a capacitive load 183, which is electrically connected to an output terminal 185. These components can also include a pass transistor 181, which is electrically connected between output node 116 of PCP stage 110 and the output terminal 185 and which is controlled by a supplementary charge pump (SCP) stage 150 connected in parallel with the PCP stage 110.

Specifically, SCP stage 150 can include an additional input node 155, an additional output node 156, and a pair of additional cross-coupled inverters 151 and 152 connected between additional input node 155 and additional output node 156. Additional inverter 151 can include an additional NFET 151a and an additional PFET 151b connected in series between additional input node 155 and additional output node 156. Additional inverter 152 can similarly include an additional NFET 152a and an additional PFET 152b connected in series between additional input node 155 and additional output node 156. An additional intermediate node 157 at the junction between additional NFET 151a and additional PFET 151b (e.g., on an interconnect electrically connecting additional NFET 151a to additional PFET 151b) can be electrically connected to the gates of additional NFET 152a and additional PFET 152b. Similarly, an additional intermediate node 158 at the junction between additional NFET 152a and additional PFET 152b (e.g., on an interconnect electrically connecting additional NFET 152a and additional PFET 152b) can be electrically connected to the gates of additional NFET 151a and additional PFET 151b.

SCP stage 150 can further include a pair of additional clock signal nodes 161 and 162. The additional clock signal nodes 161 and 162, like clock signal nodes 121 and 122, can be electrically connected to receive CLK1 and CLK1B from clock driver 105.

SCP stage 150 can further include a pair of additional capacitors 153 and 154 connected between the additional clock signal nodes 161 and 162 and additional intermediate nodes 157 and 158, respectively. That is, additional capacitor 153 can include conductive plates, which are connected to additional clock signal node 161 and additional intermediate node 157, respectively, and which are separated from each other by a capacitor dielectric. Additional capacitor 154 can similarly include conductive plates, which are connected to additional clock signal node 162 and additional intermediate node 158, respectively, and which are also separated from each other by a capacitor dielectric. It should be noted that the additional capacitors 153 and 154 of SCP stage 150 can be significantly smaller than the capacitors 113 and 114 of PCP stage 110. For example, capacitance (C) of capacitors 113 and 114 could be 100 times greater than capacitance (Cr1) of additional capacitors 153 and 154. For example, in some embodiments, C could be 10 picofarads (pF) and Cr1 could be 0.1 pF.

Figure 2A:
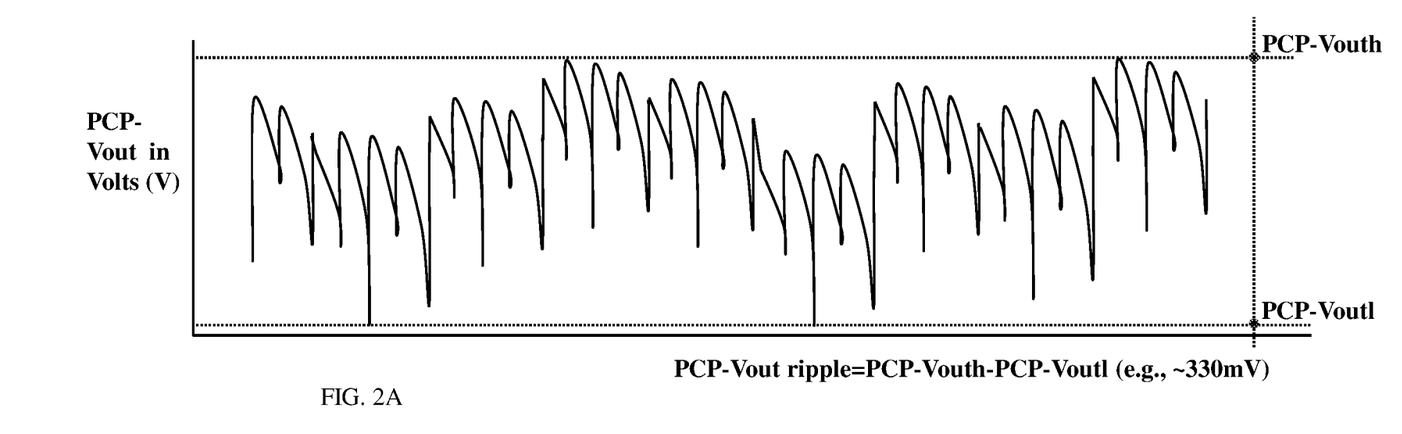
FIGS. 2A and 2B are graphs illustrating and comparing example values for PCP-Vout and for SCP-Vout in the charge pump circuit of FIG. 1A.
Figure 2B:
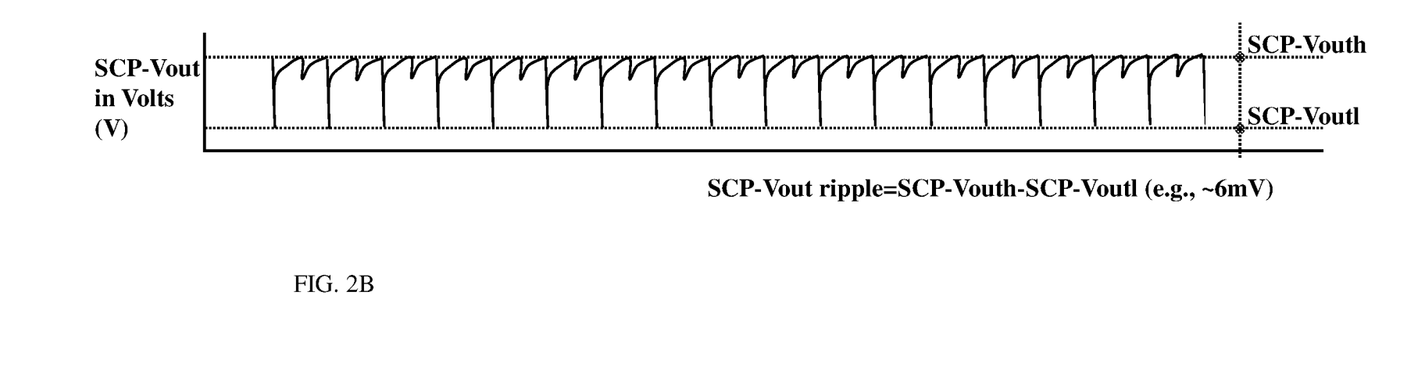

The additional input node 155 of this SCP stage 150 can also be connected to receive Vin and SCP stage 150 can operate in parallel with and in essentially the same manner as PCP stage 110 in order to output a SCP output voltage (SCP-Vout) 159 at additional output node 156. SCP stage 150 can further include an additional capacitive load 165 electrically connected to additional output node 156. Due to the relatively low capacitances of the additional capacitors 153 and 154 and due to additional capacitive load 165, SCP-Vout 159 (which is applied to gate of pass transistor 181) exhibits significantly reduced ripple as compared to PCP-Vout 119. That is, SCP-Vout ripple refers to the difference between the maximum voltage level exhibited by SCP-Vout (also referred to herein as SCP-Vout high (PCP-Vouth)) and the minimum voltage level exhibited by SCP-Vout (also referred to herein as SCP-Vout low (SCP-Voutl) and SCP-Vout ripple is less than PCP-Vout ripple. FIGS. 2A and 2B are graphs illustrating and comparing example values for PCP-Vout 119 and SCP-Vout 159 in a circuit 100 where all transistors contained therein are 1.8V transistors and where VDDA is 1.8V.

The gate of pass transistor 181 can be electrically connected to receive SCP-Vout 159. Pass transistor 181 can be another NFET such that SCP-Vout 159 continuously maintains pass transistor 181 in an on-state. Thus, pass transistor 181 and capacitive load 183, in combination, form a low pass filter that reduces ripple. Those skilled in the art will recognize that inclusion of pass transistor 181 circuit 100 will also slightly reduce aVout 190 by some amount (e.g., by approximately 100 mV). Thus, for example, in an embodiment where VDDA is 1.8V and a resistive load 182 is included in the circuit 100, aVout 190 at output terminal 185 may be pulled down toward 2.9V.

Figure 2C:
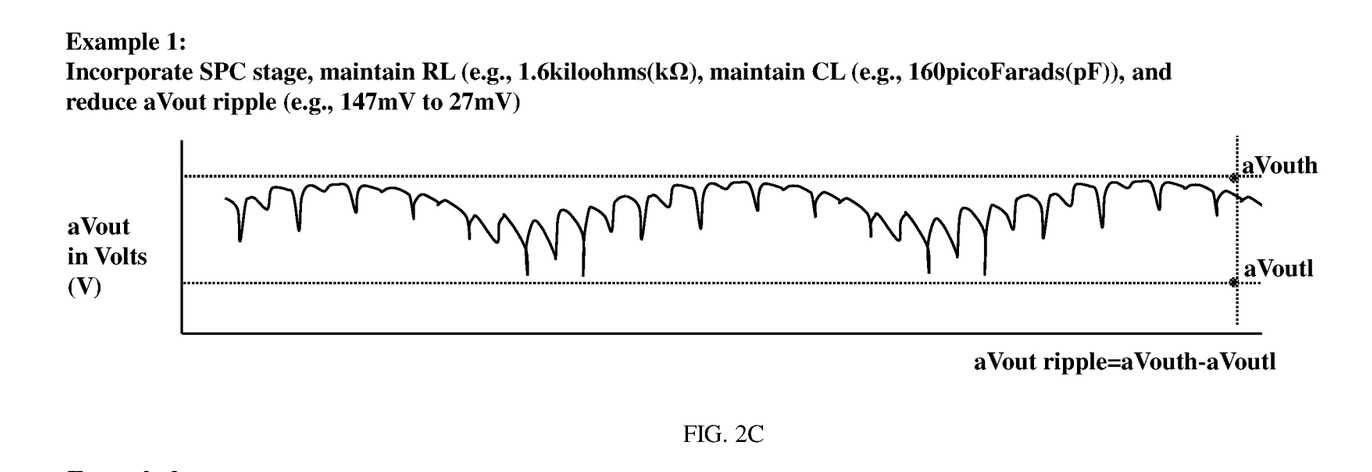
FIG. 2C is a graph illustrating a Vout in one example where reducing ripple is prioritized over reducing area.
Figure 2D:
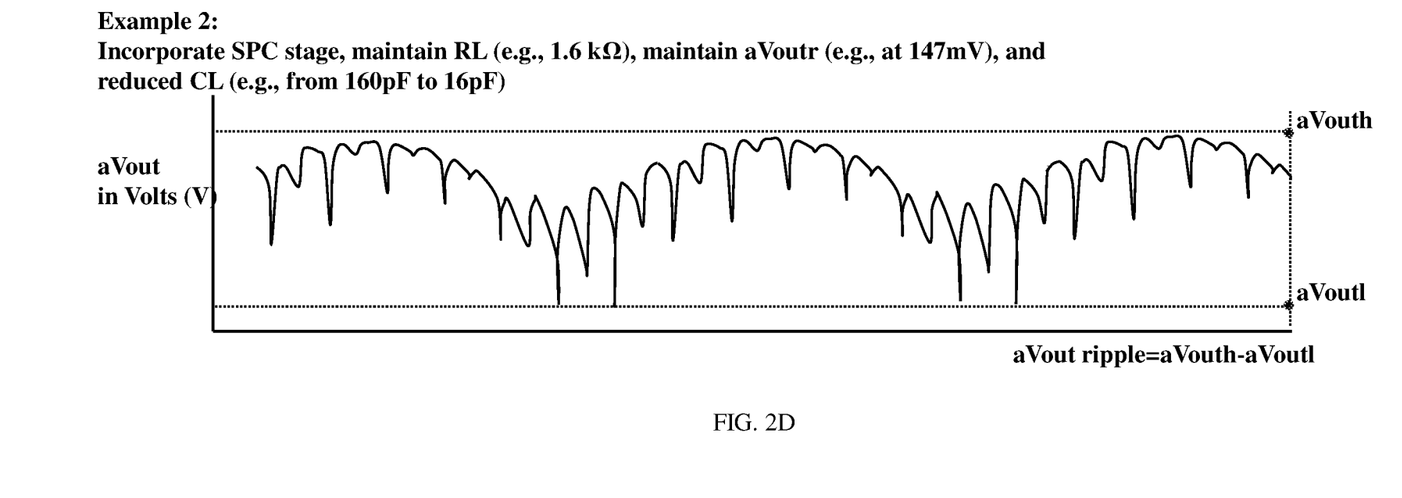
FIG. 2D is a graph illustrating a Vout in another example where reducing area is prioritized over reducing ripple.

It should be understood that, during design of a circuit 100 with an SCP stage 150, the size of CL 183 can be selected to achieve a desired balance between an acceptable a Vout ripple (i.e., the amount of ripple exhibited by aVout 190 at output terminal 185) and the overall size of circuit 100. FIG. 2C is a graph illustrating aVout 190 in a first example (Example 1) of a circuit 100 with design specifications including a set resistive load (RL) 182 (e.g., of 1.6 kilohms (kΩ) for current driving purposes and a set CL 183 (e.g., of 160 picoFarads (pF)). In this case, SCP stage 150 can be incorporated into circuit 100 to further reduce a Vout ripple by, for example, up to 5 times (e.g., from 147 mV to 27 mV). FIG. 2D is a graph illustrating aVout 190 in a second example (Example 2) of a circuit 100 with design specifications including a set RL 182 (e.g., of 1.6 kΩ) for current driving purposes and an acceptable a Vout ripple of, for example, 147 mV. In this case, a SCP stage 150 can be incorporated into circuit 100 in order to keep aVout ripple at or below 147 mV, while CL 183 is reduced, for example, by approximately 90%. (e.g., from 160 pF to 16 pF). It should be understood that the values provided for RL, CL, aVout ripple in the examples shown in FIGS. 2A-2D are provided for illustration purposes and are not intended to be limiting.

Figure 3:
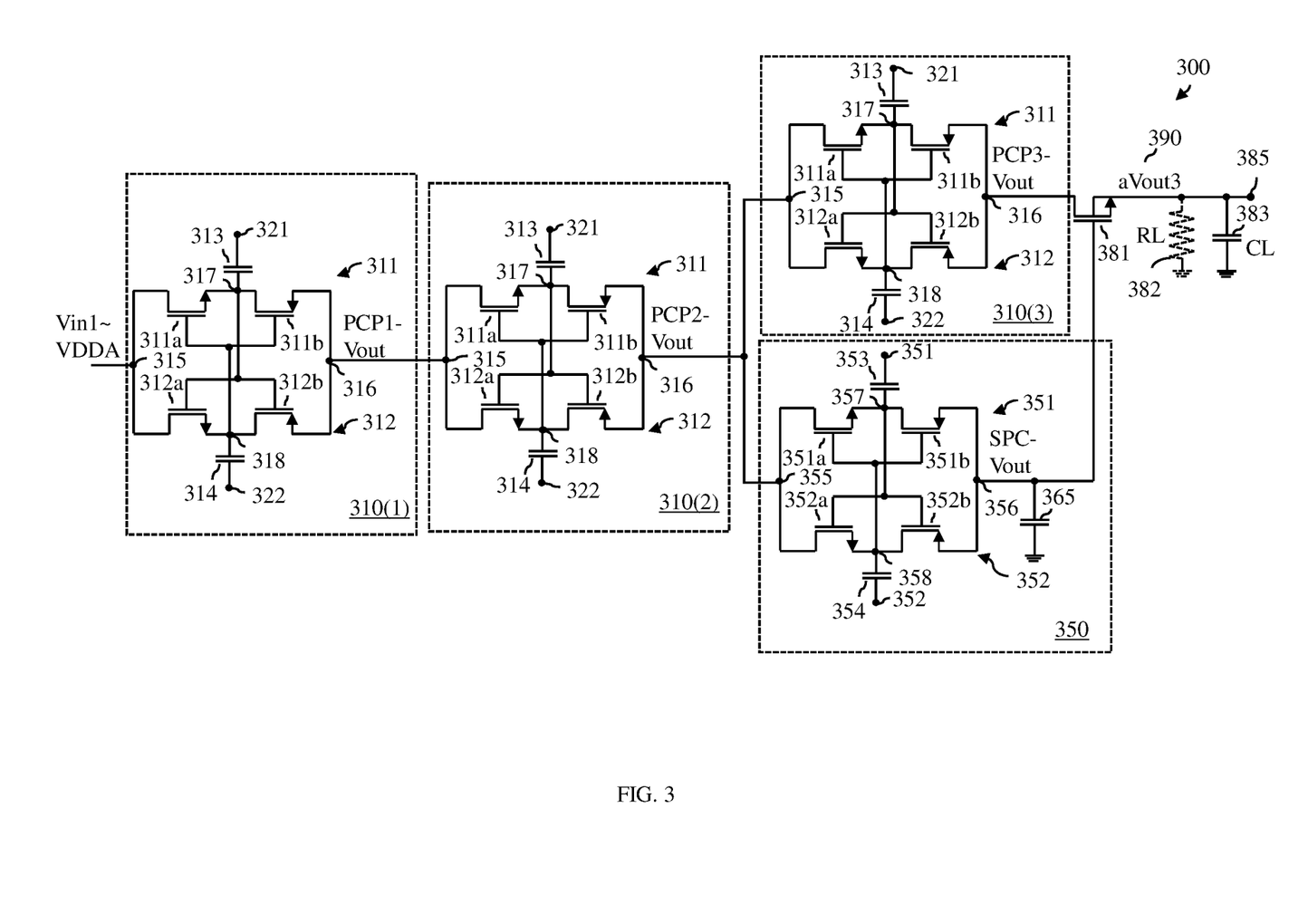
FIG. 3 is a schematic diagram illustrating additional disclosed embodiments of a charge pump circuit.

Referring to FIG. 3, also disclosed herein are embodiments of a structure and, particularly, of a charge pump circuit 300 (hereinafter referred to as circuit 300) that includes multiple PCP stages connected in series. This circuit 300 can, like the circuit 100 of FIG. 1, also include a pass transistor 381 and SCP stage 350. More particularly, for purposes of illustration, circuit 300 is shown in FIG. 3 as including three PCP stages 310(1)-310(3) connected in series. However, FIG. 3 is not intended to be limiting. Alternatively, such a circuit 300 could include any number (n) of two or more PCP stages including at least a first PCP stage (e.g., 310(1)) and a last PCP stage (e.g., 310(3)). Additionally, the discussion below refers to a next-to-last PCP stage or a preceding primary charge pump stage, which is immediately adjacent and upstream of the last primary charge pump stage. In a circuit 300 with three PCP stages, as illustrated, the next-to-last PCP stage or preceding PCP stage refers to the second PCP stage 310(2). However, it should be understood that in a circuit with only two PCP stages, this next-to-last PCP stage or preceding PCP stage, which is immediately adjacent and upstream of the last PCP stage would be the first PCP stage. In a circuit with four PCP stages, this next-to-last PCP stage or preceding PCP stage, which is immediately adjacent and upstream of the last PCP stage would be the third PCP stage, and so on.

Each PCP stage (e.g., 310(1)-310(3)) can include an input node 315, an output node 316, and a pair of cross-coupled inverters 311 and 312 connected between input node 315 and output node 316. One inverter 311 can include an NFET 311a and PFET 311b connected in series between input node 315 and output node 316. Another inverter 312 can similarly include an NFET 312a and a PFET 312b connected in series between input node 315 and output node 316. An intermediate node 317 at the junction between NFET 311a and PFET 311b (e.g., on an interconnect electrically connecting NFET 311a to PFET 311b) can be electrically connected to the gates of NFET 312a and PFET 312b. Similarly, an intermediate node 318 at the junction between NFET 312a and PFET 312b (e.g., on an interconnect electrically connecting NFET 312a and PFET 312b) can be electrically connected to the gates of NFET 311a and PFET 311b.

Each PCP stage (e.g., 310(1)-310n) can further include a pair of clock signal nodes 321 and 322. Each PCP stage 110 can further include a pair of capacitors 313 and 314 connected between the clock signal nodes 321 and 322 and the intermediate nodes 317 and 318, respectively. That is, capacitor 313 can include conductive plates, which are connected to clock signal node 321 and intermediate node 117, respectively, and which are separated from each other by a capacitor dielectric. Capacitor 314 can similarly include conductive plates, which are connected to clock signal node 322 and intermediate node 318, respectively, and which are also separated from each other by a capacitor dielectric.

Generally, in operation, first PCP stage 310(1) input node 315 receives Vin1, which is steady at VDDA. Due to clock and inverted clock signals on the first PCP stage clock signal nodes 321-322 in combination with the capacitances of the first PCP stage capacitors 313 and 314, the first PCP stage output node 316 outputs PCP1-Vout that is continuously pulled toward 2*VDDA. Second PCP stage 310(2) input node 315 receives PCP1-Vout. Due to clock and inverted clock signals on the second PCP stage clock signal nodes 321-322 in combination with the capacitances of the second PCP stage capacitors 313 and 314, the second PCP stage output node 316 outputs PCP2-Vout that is continuously pulled toward 3*VDDA. Third PCP stage 310(3) input node 315 receives PCP2-Vout. Due to clock and inverted clock signals on the third PCP stage clock signal nodes 321-322 in combination with the capacitances of the third PCP stage capacitors 313 and 314, the third PCP stage output node 316 outputs PCP3-Vout that is pulled toward 4*VDDA. In other words, the input node of the first PCP stage receives Vin and the input nodes of all downstream stages receive the output voltage from the immediately preceding upstream stage. For example, the last input node of the last PCP stage (e.g., 310(1)) receives that output voltage from the immediately preceding upstream PCP stage (e.g., 310(2)).

In some embodiments, clock signal nodes 321 in each of the PCP stages can be electrically connected to receive the same clock signal (CLK1) and clock signal nodes 322 in each of the PCP stages can be electrically connected to receive the same inverted clock signal (CLK1B). For example, if Vin at the input node 315 of the first PCP stage 310(1) is at VDDA, then CLK1 can swing periodically between 0.0V and VDDA and CLK1B can swing periodically between VDDA and 0.0V. That is, as CLK1 changes from VDDA to 0.0V, CLK1B switches from 0.0V to VDDA and vice versa. CLK1 and CLK1B can be generated, for example, by a clock driver that is configured essentially the same as the clock driver 105 of FIG. 1B described above. In these embodiment, sizes of the capacitors 313 and 314 increase from stage to stage in order to achieve the desired output voltage. For example, if capacitors 313 and 314 in first PCP stage 310(1) each have a capacitance (C), then capacitors 313 and 314 in second PCP stage 310(2) can have a capacitance of 2*C and capacitors 313 and 314 in third PCP stage 310(3) can have a capacitance of 3*C.

In other embodiments, capacitors 313 and 314 can be the same size so as to have the same capacitance (C) in each of the PCP stages. In these embodiments, the clock and inverter clock signals applied to the clock signal nodes 321 in each of the PCP stages must be different and, particularly, voltage level shifter. For example, clock signal nodes 321 and 322 of first PCP stage 310(1) can receive a first clock signal (CLK1) and an inverted first clock signal (CLK1B). Clock signal nodes 321 and 322 of second PCP stage 310(2) can receive a second clock signal (CLK2) and an inverted second clock signal (CLK2B). Clock signal nodes 321 and 322 of third PCP stage 310(3) can receive a third clock signal (CLK3) and an inverted third clock signal (CLK3B). In these embodiments, if Vin at the input node 315 of the first PCP stage 310(1) is at VDDA, then CLK1 can swing periodically between 0.0V and VDDA and CLK1B can swing periodically between VDDA and 0.0V. That is, as CLK1 changes from VDDA to 0.0V, CLK1B switches from 0.0V to VDDA and vice versa. CLK2 can swing periodically between VDDA and 2*VDDA and CLK2B can swing periodically between 2*VDDA and VDDA. That is, as CLK2 changes from 2*VDDA to VDDA, CLK2B switches from VDDA to 2*VDDA and vice versa. CLK3 can swing periodically between 2*VDDA and 3*VDDA and CLK3B can swing periodically between 3*VDDA and 2*VDDA. That is, as CLK3 changes from 3*VDDA to 2*VDDA, CLK3B switches from 2*VDDA to 3*VDDA and vice versa. Such clock signals can for example be generated by a clock generation circuit that includes a clock driver as well as voltage level shifters to achieve the desired clock and inverted clock signal.

It should be understood that each PCP stage (e.g., 310(1)-310(3)) operates in essentially the same manner as PCP stage 110 of FIG. 1A discussed above, except that the output voltage at the output node various as a function of the input voltage at the input node, voltage levels of the clock and inverter clock signals at the clock signal nodes 321-322 and the capacitances of the capacitors 313-314.

Optionally, circuit 300 can also include a resistive load 382, which is electrically connected to output terminal 385 for driving current. This resistive load 382 may reduce the voltage level at output terminal 385 somewhat. For example, given a resistive load 382, an adjusted output voltage (aVout) 390 at output terminal 385 may be pulled down. For example, if PCP3-Vout on output node 316 of the last PCP stage 310(3) is on average at a voltage level of 4*VDDA, then aVout 390 at output terminal 185 may be average less than 4*VDDA.

Furthermore, ripple of PCP3-Vout may be significant. Therefore, circuit 300 can include a combination of components designed to reduce ripple of aVout 390 at output terminal 385 and, particularly, to ensure that a Vout ripple is less than PCP3-Vout ripple. PCP-Vout ripple refers to the difference between the maximum voltage level exhibited by PCP3-Vout and the minimum voltage level exhibited by PCP3-Vout. aVout ripple refers to the difference between the maximum voltage level exhibited by aVout 390 at output terminal 385 and the minimum voltage level exhibited by aVout 390. The ripple reducing components can include a capacitive load 383, which is electrically connected to an output terminal 385. These components can also include a pass transistor 381, which is electrically connected between output node 316 of the last PCP stage (e.g., 310(3)) and the output terminal 385 and which is controlled by a supplementary charge pump (SCP) stage 350 connected in parallel with the last PCP stage.

Specifically, SCP stage 350 can include an additional input node 355, an additional output node 356, and a pair of additional cross-coupled inverters 351 and 352 connected between additional input node 355 and additional output node 356. Additional inverter 351 can include an additional NFET 351a and an additional PFET 351b connected in series between additional input node 355 and additional output node 356. Additional inverter 352 can similarly include an additional NFET 352a and an additional PFET 352b connected in series between additional input node 355 and additional output node 356. An additional intermediate node 357 at the junction between additional NFET 351a and additional PFET 351b (e.g., on an interconnect electrically connecting additional NFET 351a to additional PFET 351b) can be electrically connected to the gates of additional NFET 352a and additional PFET 352b. Similarly, an additional intermediate node 358 at the junction between additional NFET 352a and additional PFET 352b (e.g., on an interconnect electrically connecting additional NFET 352a and additional PFET 352b) can be electrically connected to the gates of additional NFET 351a and additional PFET 351b.

SCP stage 350 can further include a pair of additional clock signal nodes 361 and 362. The additional clock signal nodes 361 and 362 can be electrically connected to receive the same clock and inverted clock signals as the last PCP stage (e.g., 310(3)). For example, in some embodiments, additional clock signal nodes 361 and 362 can be electrically connected to receive CLK1 and CLK1B (e.g., if all PCP stages receive the same clock and inverter clock signals). In other embodiments, additional clock signal nodes 361 and 362 are electrically connected to receive CLK3 and CLK3B (e.g., if the last PCP stage receives CLK3 and CLK3B).

SCP stage 350 can further include a pair of additional capacitors 353 and 354 connected between the additional clock signal nodes 361 and 362 and additional intermediate nodes 357 and 358, respectively. That is, additional capacitor 353 can include conductive plates, which are connected to additional clock signal node 361 and additional intermediate node 357, respectively, and which are separated from each other by a capacitor dielectric. Additional capacitor 354 can similarly include conductive plates, which are connected to additional clock signal node 362 and additional intermediate node 358, respectively, and which are also separated from each other by a capacitor dielectric. It should be noted that the additional capacitors 353 and 354 of SCP stage 350 can be significantly smaller than the capacitors 313 and 314 of the last PCP stage (e.g., 310(3)). For example, capacitance (C) of capacitors 313 and 314 of last PCP stage could be one-hundred times greater than capacitance (Cr1) of additional capacitors 353 and 354.

The additional input node 355 of this SCP stage 350 can be connected to receive the same input voltage as the last PCP stage (e.g., 310(3)). As mentioned above, the last PCP stage receives the output voltage from the immediately preceding upstream PCP stage (e.g., PCP2-Vout from second PCP stage 310(2)). SCP stage 350 can operate in parallel with and in essentially the same manner as the last PCP stage (e.g., 310(3)) in order to output a SCP output voltage (SCP-Vout) 359 at additional output node 356.

SCP stage 350 can further include an additional capacitive load 365 electrically connected to additional output node 356. Due to the relatively low capacitances of the additional capacitors 353 and 354 and due to additional capacitive load 365, SCP-Vout 359 (which is applied to gate of pass transistor 381) exhibits significantly reduced ripple as compared to PCP3-Vout. The gate of pass transistor 381 can be electrically connected to receive SCP-Vout 359. Pass transistor 381 can be another NFET such that SCP-Vout 359 continuously maintains pass transistor 381 in an on-state. Thus, pass transistor 381 and capacitive load 383, in combination, form a low pass filter that reduces ripple. Those skilled in the art will recognize that inclusion of pass transistor 381 circuit 300 will also slightly reduce a Vout 359 by some amount (e.g., by approximately 100 mV).

It should be understood that, during design of a circuit 300 with an SCP stage 350, the size of CL 383 can be selected to achieve a desired balance between an acceptable a Vout ripple and the overall size of circuit 300 (e.g., in essentially the same manner as described above with regard to circuit 100).

In the method and structures described above, a semiconductor material refers to a material whose conducting properties can be altered by doping with an impurity. Exemplary semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped with a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region.

It should be understood that the terminology used herein is for the purpose of describing the disclosed structures and methods and is not intended to be limiting. For example, as used herein, the singular forms "a," "an," and "the" are intended to include the plural forms as well, unless the context clearly indicates otherwise. Additionally, as used herein, the terms "comprises," "comprising," "includes," and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right," "left," "vertical," "horizontal," "top," "bottom," "upper," "lower," "under," "below," "underlying," "over," "overlying," "parallel," "perpendicular," etc., are intended to describe relative locations as they are oriented and illustrated in the drawings (unless otherwise indicated) and terms such as "touching," "in direct contact," "abutting," "directly adjacent to," "immediately adjacent to," etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various disclosed embodiments have been presented for purposes of illustration but are not intended to be exhaustive or limiting. Many modifications and variations will be apparent to those of ordinary skill in the art without departing from the scope and spirit of the disclosed embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a primary charge pump stage including an input node and an output node;
   supplementary charge pump stage including an additional input node and an additional output node, wherein the input node and the additional input node are connected to receive an input voltage;
   an output terminal; and
   a pass transistor connected between the output terminal and the output node and having a gate connected to the additional output node.

2. The structure of claim 1, wherein the primary charge pump stage includes:
   cross-coupled inverters connected between the input node and the output node, wherein the cross-coupled inverters have intermediate nodes, respectively, with each intermediate node being at an interconnect between a P-channel field effect transistor (PFET) and an N-channel field effect transistor (NFET) of one of the cross-coupled inverters;
   clock signal nodes connected to receive clock and inverted clock signals, respectively; and
   capacitors connected between the clock signal nodes and the intermediate nodes.

3. The structure of claim 2, wherein the supplementary charge pump stage includes:
   additional cross-coupled inverters connected between the additional input node and the additional output node, wherein the additional cross-coupled inverters have additional intermediate nodes, respectively, with each additional intermediate node being at an interconnect between an additional PFET and an additional NFET of one of the additional cross-coupled inverters;

additional clock signal nodes connected to receive the clock and inverted clock signals, respectively; and additional capacitors connected between the additional clock signal nodes and the additional intermediate nodes.

4. The structure of claim 3, wherein the capacitors are larger than the additional capacitors.

5. The structure of claim 3, wherein the capacitors are at least 100 times larger than the additional capacitors.

6. The structure of claim 1, wherein the output terminal is connected to a capacitive load.

7. The structure of claim 1, wherein the output terminal is connected to a resistive load.

8. A structure comprising:
   a primary charge pump stage including an input node and an output node;
   a supplementary charge pump stage including an additional input node and an additional output node, wherein the input node and the additional input node are connected to receive an input voltage;
   an output terminal connected to a capacitive load; and
   a pass transistor connected between the output terminal and the output node and having a gate connected to the additional output node.

9. The structure of claim 8, wherein the primary charge pump stage includes:
   cross-coupled inverters connected between the input node and the output node, wherein the cross-coupled inverters have intermediate nodes, respectively, with each intermediate node being at an interconnect between a P-channel field effect transistor (PFET) and an N-channel field effect transistor (NFET) of one of the cross-coupled inverters;
   clock signal nodes connected to receive clock and inverted clock signals, respectively; and
   capacitors connected between the clock signal nodes and the intermediate nodes.

10. The structure of claim 9, wherein the supplementary charge pump stage includes:
   additional cross-coupled inverters connected between the additional input node and the additional output node, wherein the additional cross-coupled inverters have additional intermediate nodes, respectively, with each additional intermediate node being at an interconnect between an additional PFET and an additional NFET of one of the additional cross-coupled inverters;
   additional clock signal nodes connected to receive the clock and inverted clock signals, respectively; and
   additional capacitors connected between the additional clock signal nodes and the additional intermediate nodes.

11. The structure of claim 10, wherein the capacitors are larger than the additional capacitors.

12. The structure of claim 10, wherein the capacitors are at least 100 times larger than the additional capacitors.

13. The structure of claim 8, wherein the output terminal is connected to a resistive load.

14. A structure comprising:
   multiple primary charge pump stages connected in series including at least a first primary charge pump stage and a last primary charge pump stage, wherein the last primary charge pump stage of the multiple primary charge pump stages includes a last input node and a last output node;
   a supplementary charge pump stage including an additional input node and an additional output node, wherein the last input node and the additional input node are connected to receive a last input voltage from a preceding primary charge pump stage;
   an output terminal; and
   a pass transistor connected between the output terminal and the last output node and having a gate connected to the additional output node.

15. The structure of claim 14, wherein each primary charge pump stage includes:
   cross-coupled inverters connected between input and output nodes, wherein the cross-coupled inverters have intermediate nodes, respectively, with each intermediate node being at an interconnect between a P-channel field effect transistor (PFET) and an N-channel field effect transistor (NFET) of one of the cross-coupled inverters;
   clock signal nodes connected to receive clock and inverted clock signals, respectively; and
   capacitors connected between the clock signal nodes and the intermediate nodes.

16. The structure of claim 15, wherein the supplementary charge pump stage includes:
   additional cross-coupled inverters connected between the additional input node and the additional output node, wherein the additional cross-coupled inverters have additional intermediate nodes, respectively, with each additional intermediate node being at an interconnect between an additional PFET and an additional NFET of one of the additional cross-coupled inverters;
   additional clock signal nodes connected to receive the clock and inverted clock signals, respectively; and
   additional capacitors connected between the additional clock signal nodes and the additional intermediate nodes.

17. The structure of claim 16, wherein the capacitors of the last primary charge pump stage are larger than the additional capacitors of the supplementary charge pump stage.

18. The structure of claim 16, wherein the capacitors of the last primary charge pump stage are at least 100 times larger than the additional capacitors of the supplementary charge pump stage.

19. The structure of claim 14, wherein the output terminal is connected to a capacitive load.

20. The structure of claim 14, wherein the output terminal is connected to a resistive load.

* * * * *